(12) United States Patent
Picas Meya

(10) Patent No.: US 9,497,952 B2
(45) Date of Patent: Nov. 22, 2016

(54) BAIT TRAP FOR INSECTS

(71) Applicant: MYLVA, S.A., Barcelona (ES)

(72) Inventor: Mateu Picas Meya, Barcelona (ES)

(73) Assignee: MYLVA, S.A., Barcelona (ES)

( * ) Notice: Subject to any disclaimer, the term of this patent is extended or adjusted under 35 U.S.C. 154(b) by 207 days.

(21) Appl. No.: 14/221,423

(22) Filed: Mar. 21, 2014

(65) Prior Publication Data

US 2014/0283436 A1   Sep. 25, 2014

(30) Foreign Application Priority Data

Mar. 22, 2013   (ES) .................................. 201330420

(51) Int. Cl.
*A01M 25/00* (2006.01)
*A01M 1/10* (2006.01)
*A01M 1/20* (2006.01)

(52) U.S. Cl.
CPC ............ *A01M 1/103* (2013.01); *A01M 1/2011* (2013.01); *A01M 2200/011* (2013.01)

(58) Field of Classification Search
USPC ........................................ 43/131, 132.1, 133
See application file for complete search history.

(56) References Cited

U.S. PATENT DOCUMENTS

| | | | | |
|---|---|---|---|---|
| D451,573 S | * | 12/2001 | Clark, III | ...................... D22/122 |
| 6,532,696 B2 | * | 3/2003 | Clark, III | ............ A01M 1/2005 43/107 |
| 6,871,444 B1 | * | 3/2005 | Bernard | .............. A01M 1/2005 43/131 |
| D574,056 S | * | 7/2008 | McNamara | .................. D22/122 |
| 2008/0014171 A1 | * | 1/2008 | Zuhlke | ..................... A01M 1/02 424/84 |
| 2008/0168703 A1 | * | 7/2008 | Siljander | ............... A01M 1/026 43/131 |
| 2008/0313952 A1 | * | 12/2008 | Pettigrew | ............ A01M 25/002 43/131 |
| 2010/0205850 A1 | * | 8/2010 | Bernard | ............... A01M 1/2011 43/131 |

FOREIGN PATENT DOCUMENTS

| | | |
|---|---|---|
| DE | 20208450 U1 | 12/2003 |
| WO | 02/22466 A1 | 3/2002 |
| WO | 02/076200 A1 | 10/2002 |

OTHER PUBLICATIONS

Communication dated Oct. 15, 2014, issued by the European Patent Office in counterpart European application No. 14382087.

* cited by examiner

*Primary Examiner* — Richard G Davis
(74) *Attorney, Agent, or Firm* — Sughrue Mion, PLLC

(57) ABSTRACT

A bait trap generally for crawling insects, such as ants, cockroaches, silverfish, etc., having a bottom sheet and a top sheet attached to one another in a leak-tight manner at their respective edges forming an enclosure for holding bait, and at least one inlet communicating with the enclosure and sized so that the target insect can access the enclosure and reach the bait. The bottom and top sheets also form a bait reservoir connected with the enclosure through an initially obstructed passage suitable for being opened and allowing transferring bait from the reservoir to the enclosure in response to a pressure increase in the reservoir as the reservoir is being pressed using one's fingers.

16 Claims, 7 Drawing Sheets

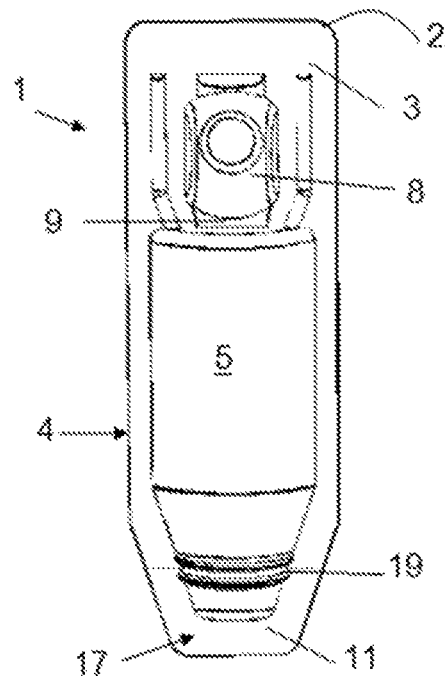
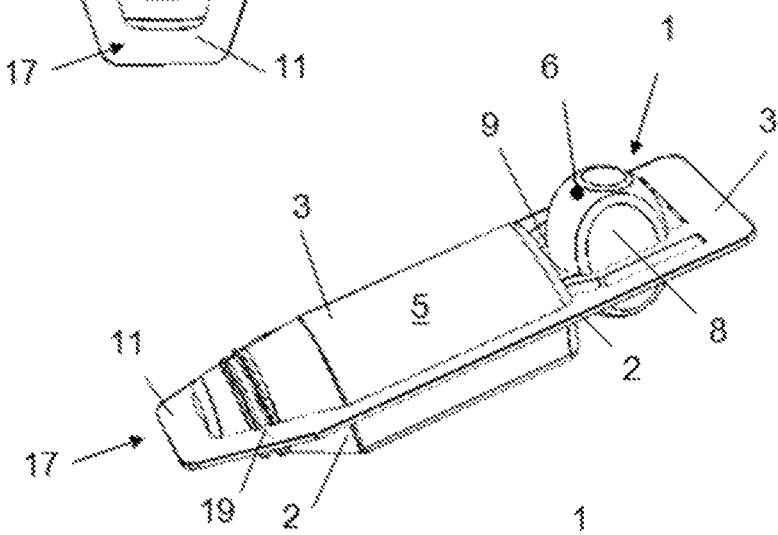
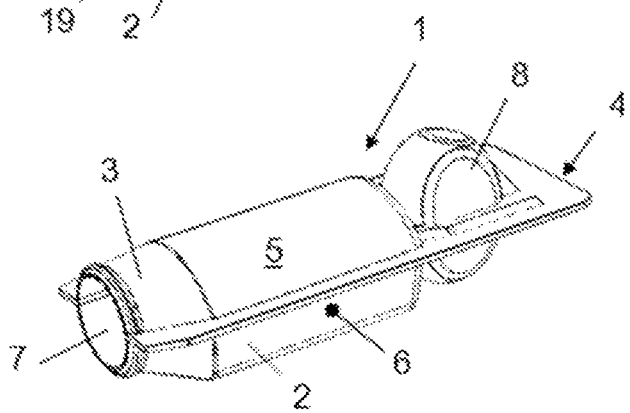
Fig. 6a
Fig. 6b
Fig. 6c

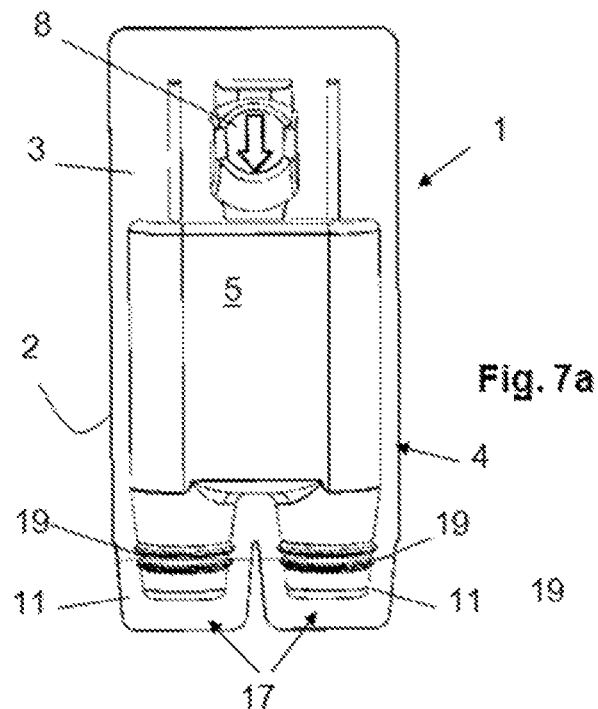
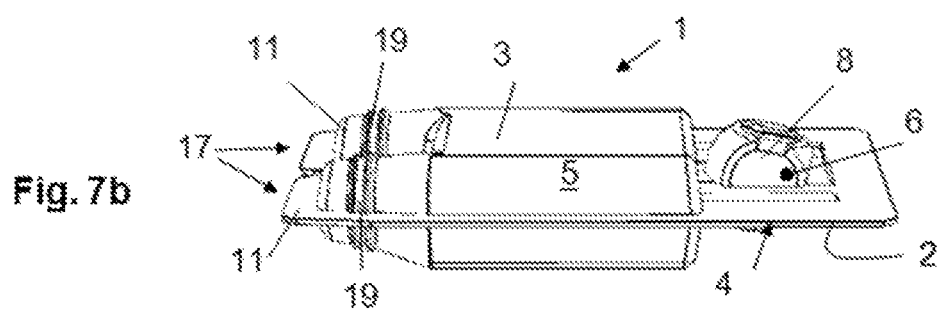
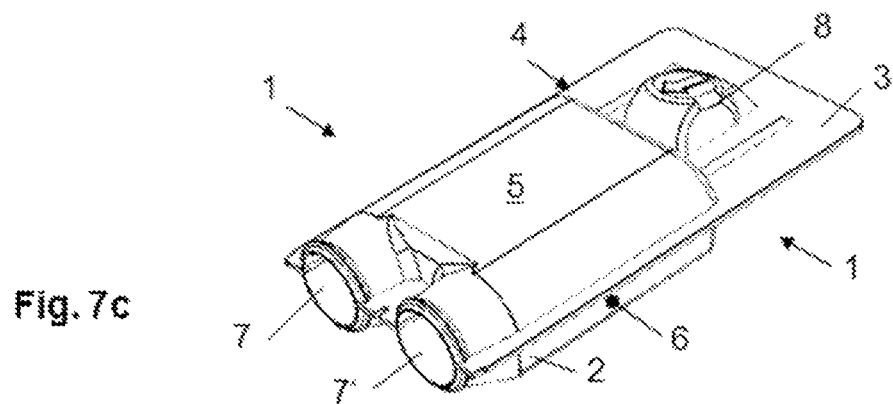

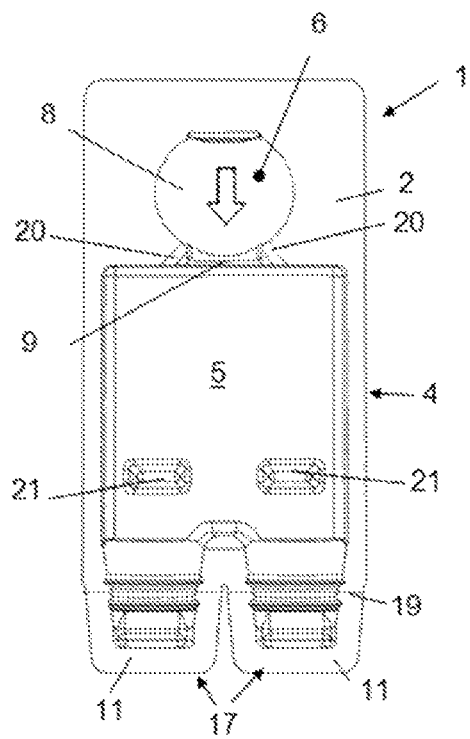
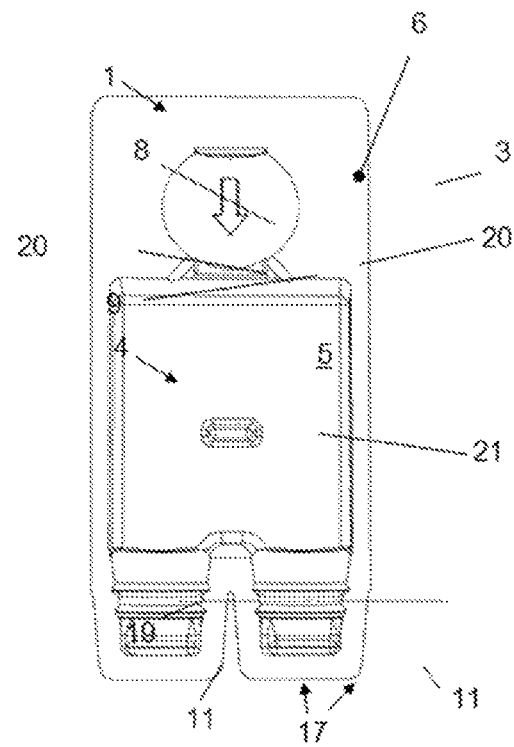
Fig. 10a　　　　　　Fig. 10b
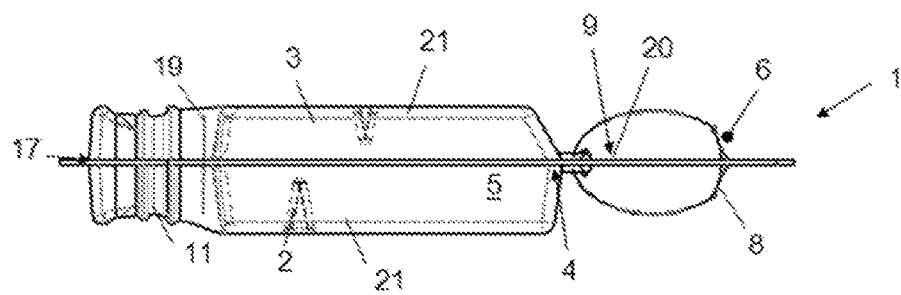
Fig. 10c

BAIT TRAP FOR INSECTS

CROSS REFERENCE TO RELATED APPLICATIONS

This application claims priority based in Spanish Patent Application No. P 201330420filed Mar. 22, 2013, the contents of all of which are incorporated herein by reference in their entirety.

TECHNICAL FIELD OF THE INVENTION

The bait trap for insects of the present invention is of the type known as a bait station which is suitable for pest control generally against crawling insects, such as ants, cockroaches, silverfish, etc., and contains an insecticide bait such as a liquid, pasty or gel bait.

BACKGROUND OF THE INVENTION

Bait traps for insects comprising a receptacle containing liquid bait which lures insects and which in turn also incorporates insecticide elements that are not detected by insects are known in the state of the art. These insecticide elements usually have a delayed effect so insects such as ants transport the liquid bait to their colonies and spread it to the rest of the insects so that it is therefore more effective against pests.

To prevent the user from having to handle the liquid insecticide, single-use bait traps for insects such as those described in patent document WO02076200 are known, in which the bait trap is a container in which the liquid insecticide is incorporated during manufacture. After incorporating the liquid insecticide, such bait traps are sealed, said bait traps forming flexible containers to thus prevent liquid insecticide losses during storage and marketing. Before use, the bait trap must be opened by the end user, avoiding spillage of the liquid insecticide, and thus providing a passage for insects from the outside to the inside of the bait trap, where the liquid insecticide is arranged in a receptacle formed in the bait trap.

Nevertheless, such bait trap leads to a possible spillage and loss of part of the bait when the end user opens and places the bait trap in an operative position, the tools that can be used for opening it, such as scissors, furthermore being contaminated as they come into contact with the bait which can adhere to the walls of the container and contaminate the tools. Therefore, the tools that were used for opening the bait trap must be thoroughly cleaned and disinfected, particularly if they are tools that may come into contact with foods or if they are the user's hands. Another drawback of such bait traps is that once opened, the water in the liquid bait tends to evaporate over time, and even more rapidly if the bait trap is located in a hot place or in a place with direct sunlight. As the water in the liquid bait evaporates and said vapor seeps out of the bait trap, the bait remaining inside the bait trap gradually dries up and becomes more concentrated and dense, such that it is no longer appealing to the insects and is therefore less effective. Since the function of luring insects cannot be performed, it is necessary to replace the bait trap before all the liquid bait is gone. This drastically reduces the service life of the bait trap and furthermore entails a drawback by having to dispose of the bait trap since it still contains insecticide bait that may be harmful to the environment if it is not suitably destroyed.

To slow down the evaporation of liquid bait, bait traps such as that described in patent document U.S. Pat. No. 6,532,696 are known, which discloses a bait trap for insects provided with a plurality of chambers interconnected by means of channels. This arrangement allows slowing down the evaporation of the liquid bait since the bait can remain in the liquid state for a longer time in the chambers farthest away from the inlet while the liquid bait in the chambers closest to the inlet evaporates. Therefore, insects will first consume the liquid bait in the chambers closest to the inlet and then proceed to consume the liquid bait in the chambers farthest away from the inlet, being able to partially refill the chambers closest to the inlet with liquid bait by means of channels. Nevertheless, as the liquid bait in the chambers closest to the inlet evaporates and becomes pastier and unappealing to insects, these insects often do not proceed to consume the liquid bait in the chambers farthest away from the inlet, wasting part of the liquid bait. Nevertheless, such bait trap does not prevent possible bait spillage and loss when the end user opens and places the bait trap in an operative position either.

An objective of the present invention is to therefore disclose an alternative to known bait traps for insects.

Another objective of the present invention is to disclose a bait trap for insects that prevents bait loss when it is opened and put in an operative position.

Another objective of the present invention is to disclose a bait trap for insects with bait that allows prolonging the service life of the bait trap by keeping the bait in its initial state, preventing it from drying up.

DISCLOSURE OF THE INVENTION

The bait trap for insects of the present invention is of the type comprising a bottom sheet and a top sheet attached to one another in a leak-tight manner at their respective edges forming an enclosure for holding bait, such as a liquid, pasty, or gel bait, and at least one inlet communicating with the enclosure sized so that the target insect, which can generally be crawling insects, such as ants, cockroaches, silverfish, etc., can access the enclosure and reach the bait.

The bait trap is essentially characterized in that the bottom and top sheets also form a bait reservoir connected with the enclosure through an initially obstructed passage suitable for being opened and allowing transferring bait from the reservoir to the enclosure in response to a pressure increase in the reservoir. The bait trap can therefore be prepared for use by removing, if necessary, any seal that may be placed over the inlet, without the user getting dirty or wasting bait when placing the bait trap, since the user will press the reservoir using his/her fingers only after placing the bait trap in an operative position, such that he/she increases the pressure inside the reservoir and thus opens the initially obstructed passage between the reservoir and the enclosure, the bait initially contained in the reservoir being transferred to the enclosure where it may be accessed by the target insects as a result of pressing the reservoir.

In another variant of interest, the passage is obstructed by the leak-tight but reversible attachment between respective portions of the bottom and top sheets sealing the communication between the reservoir and the enclosure, which allows being able to manufacture said leak-tight attachment at the same time the bait trap is formed and the attachment being integrated in the bait trap, the reservoir being attached to the enclosure.

In another embodiment variant, the leak-tight but reversible attachment is an attachment obtained by heat welding or other means.

In another embodiment variant, each inlet is arranged in a projection of the enclosure, which allows being able to easily open or unseal each inlet. Each inlet can be sealed by a removable portion of the bottom sheet and top sheet, this being able to comprise a pre-cut for removing said removable portion by folding it and tearing it off with one's hands to thus more easily open the inlet for accessing the bait trap without having to use additional implements.

In another variant of interest, the enclosure formed in the bottom sheet is configured such that it has a base determining a stable support plane for the bait trap inclined with respect to the straight plane in which the attached edges of both bottom and top sheets forming the mentioned bait trap are inscribed, making it easier for insects to access the bait stored in the enclosure, while at the same hindering the evaporated bait in the cavity from easily seeping out of the bait trap.

In another embodiment variant, the area of the top sheet closing the top portion of the enclosure is configured such that it is inclined towards the inlet of the bait trap when the latter rests on a horizontal surface along the support plane determined by the base of the enclosure, this area of the top sheet being provided with means for directing the droplets of condensate that may slide over its inner face towards the enclosure and thus returning the evaporated bait to the base of the enclosure, preventing the bait from drying out and the bait trap can therefore be used for a longer time. These means for directing the droplets of condensate can be of a different type, such as embossed geometric shapes arranged in the roof of the cavity, by way of press forming into a pyramid shape, a conical shape, a saw tooth shape, a vaulted shape, etc., which allows the evaporated bait to be able to drip back to the base of the cavity as it condenses. It has been observed that this effect for using the bait trap for a longer time is achieved even with bait traps that do not incorporate the reservoir.

In one embodiment variant, the means for directing the droplets of condensate are formed by a transverse rib that has been proven to be sufficient to favor the dripping and return of the condensed evaporated bait, preventing the bait from becoming denser or drying up.

To make rib manufacture easier, said rib can be formed by a notch in the top sheet.

In one embodiment variant, the enclosure is configured such that it further has a walkway and a support coplanar with the support plane of the base of the enclosure allowing the bait trap to adopt a stable position in an operative position, allowing the target insects to access the bait.

In one embodiment variant, the enclosure comprises two inlets allowing access to the enclosure at two points, thus being able to be used simultaneously by two medium-sized insects such as two cockroaches.

Advantageously, it must be pointed out that the enclosure can be oblong, the inlets and the reservoir being located at opposite ends of said enclosure, such that the possibility of the bait being able to seep out through the inlet when pressed as it is transferred from the reservoir to the enclosure is reduced.

In another variant of interest, the enclosure comprises at least one recess or notch aligned with the inlet, acting like a partition to prevent a child from being able to reach the bait that will be held in the base of the enclosure by inserting his/her finger through the inlet. Logically, said recesses must allow insects to pass, so other recesses can be added in the enclosure such that they allow insects to pass and prevent a child from being able to reach the bait by bending his/her finger.

It is also disclosed that, particularly when the bait is dense or pasty, such as a gel, the bait trap further comprises at least one auxiliary conduit having a section smaller than the passage which is open and therefore communicates the reservoir and the enclosure such that the when the user presses the reservoir with the inlets open, the bait can be transferred from the reservoir to the enclosure also through said auxiliary conduit. The amount of bait transferred, particularly when the bait is dense, is therefore improved.

BRIEF DESCRIPTION OF THE DRAWINGS

To complement the description that is being made and for the purpose of aiding in understanding the features of the invention, a set of drawings is attached to the present specification in which the following has been depicted with an illustrative and non-limiting character:

FIGS. 6*a* to 6*c* show a second embodiment variant of the bait trap for insects of the present invention;

FIGS. 7*a* to 7*c* show a third embodiment variant of the bait trap for insects of the present invention;

FIGS. 10*a* to 10*d* show a fourth embodiment variant of the bait trap for insects of the present invention.

DETAILED DESCRIPTION OF THE DRAWINGS

Figure 1:
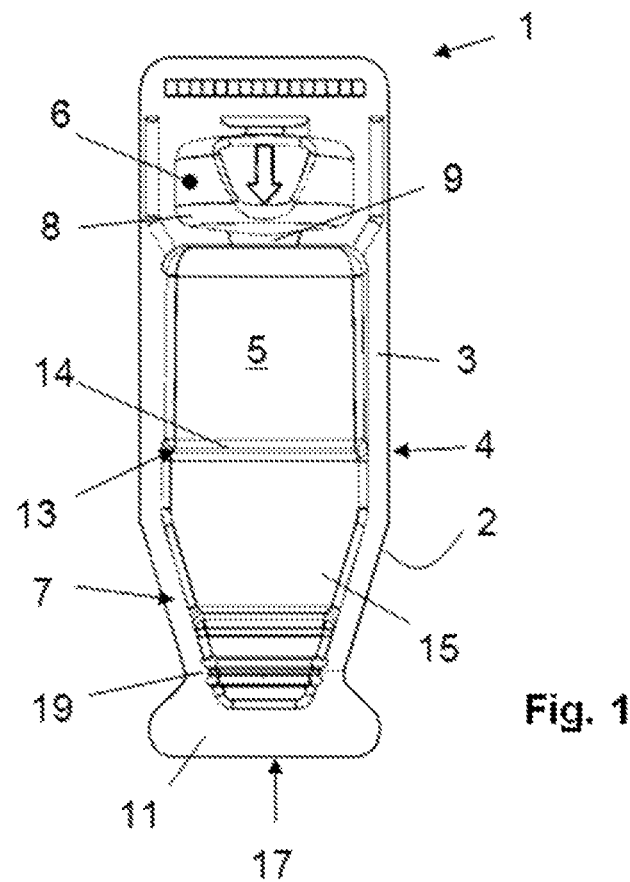
FIGS. 1 to 5 show a first embodiment variant of the bait trap for insects of the present invention.

FIGS. 1 to 5 show a first variant of the bait trap for insects of the present invention suitable for small-sized crawling insects such as ants or silverfish. FIG. 1 shows a top view and FIG. 2 a perspective view of this first variant of the bait trap 1 for insects. As can be seen, the bait trap 1 is formed by a bottom sheet 2 and a top sheet 3 formed from a flexible plastic material, for example, and attached to one another in a leak-tight manner at their respective edges 4 by means of a weld or an adhesive, for example, forming an enclosure 5 between them for holding bait 6, such as a liquid, a paste or a gel, of the type that lures insects and containing an insecticide element, and an inlet 7 communicating with the enclosure 5 and sized so that the target insect, in this case an ant or a silverfish, can access the enclosure and reach the bait 6.

Figure 2:
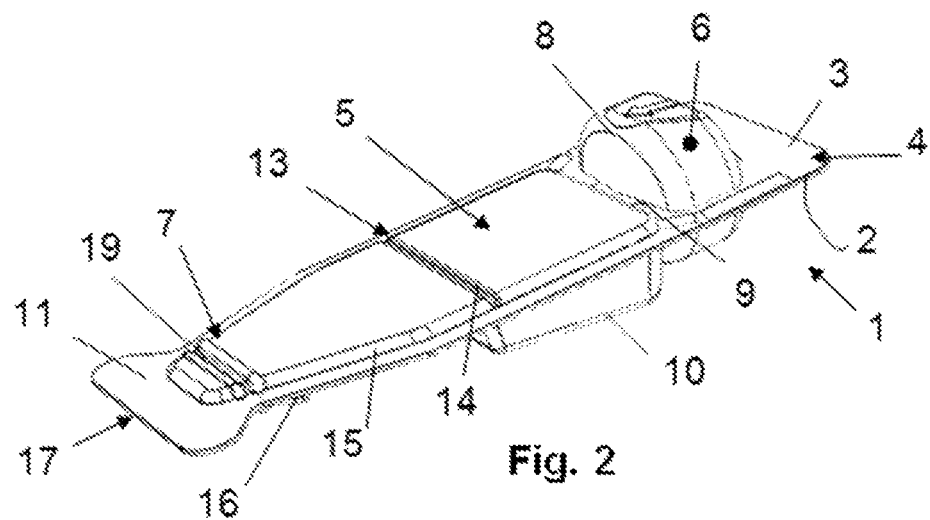
Figure 3:
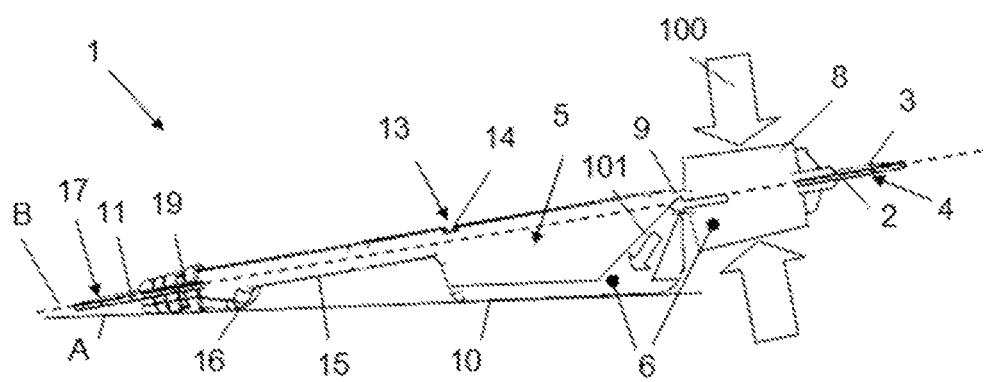
Figure 4:
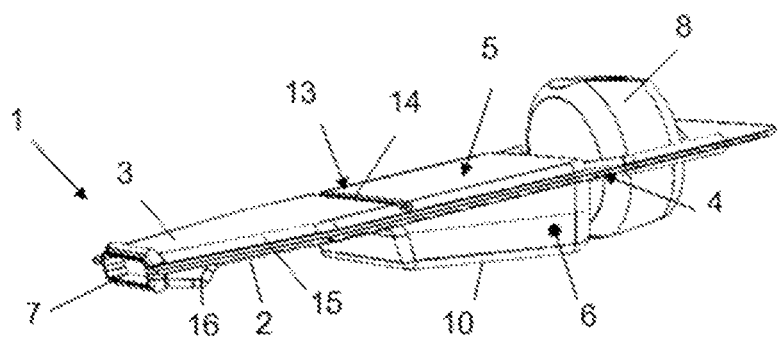
Figure 5:
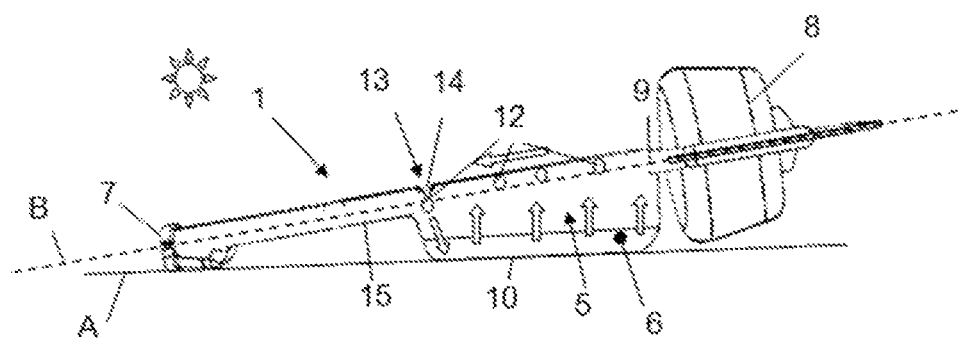

The inlet 7 in the variant shown in FIGS. 1 to 3 is sealed by a removable portion 11 of the bottom sheet 2 and the top sheet 3 comprising a pre-cut 19 which allows tearing off and removing said removable portion 11 arranged in a projection 17 of the enclosure 5 using just one's hands, the inlet 7 being open as shown in FIGS. 3 to 5. Alternatively, other means for closing the inlet 7, such as an adhesive seal that must be removed by the user also using his/her hands, could be used. Logically, the removable portion 11 can be cut by means of simple implements, such as scissors.

As can be seen, the bottom sheet 2 and top sheet 3 also form a reservoir 8 containing bait 6, connected with the enclosure 5 through an initially obstructed passage 9 suitable for being opened and allowing transferring bait 6 from the reservoir 8 to the enclosure 5 in response to a pressure increase in the reservoir 8. This operation of transferring bait 6 from the reservoir 8 to the enclosure 5 is illustrated in FIG. 3, where it can be seen that when the user exerts pressure on the reservoir 8 by squeezing it using his/her fingers in the manner schematically shown by the pressure arrows 100, the pressure exerted on the bait 6 opens the passage 9, the bait 6 being transferred from the reservoir 8 to the enclosure 5 through the passage 9 as shown by the flow arrows 101. It must be taken into account that since the bait trap 1 is initially leak-tight, it will not be possible to squeeze the reservoir 8 to transfer the bait 6 until the inlet 7 is open and allows discharging the volume of air that the bait 6 would displace from the enclosure 5. Therefore, the reservoir 8 is advantageously prevented from being squeezed when transporting and handling the bait trap 1 and before the user opens its inlets 7.

The leak-tight but reversible attachment of the passage 9 can be an attachment obtained by heat welding the inner faces of the bottom and top sheets 2, 3 or by other means allowing the inner faces to separate simply with the pressure exerted by one's fingers when pressing the reservoir 8 and thus opening the passage 9. Logically, other embodiments of this leak-tight but reversible attachment are also contemplated.

Therefore, when the inlet 7 is open and the bait 6 is arranged in the enclosure 5, the bait trap 1 is arranged in an operative position, in the manner illustrated in FIG. 4, allowing target insects, such as ants, to access the bait 6.

Since the bait 6 is initially held inside the reservoir 8, closure at the inlet 7 could even be dispensed with, the inlet initially being open, since the bait 6 could not seep out of the bait trap 1 during transport and handling, although the enclosure 5 is recommended to be leak-tight for greater safety.

Once the bait trap 1 is open and ready, the bait 6 gradually evaporates over time, more so if the bait trap 1 is heated, for example, by sunlight, and therefore the bait 6 gradually dries up and becomes less appealing to the target insects. Therefore, it is desirable for the bait 6 to remain fresh for the longest time possible to thus prolong the time in which the bait trap 1 is effective. To prevent the bait 6 from evaporating and seeping out of the bait trap 1, in the embodiment variant shown in FIGS. 1 to 5 the area of the top sheet 3, which closes the top portion of the enclosure 5 formed in the bottom sheet 2 like a roof. Said enclosure 5 is configured such that it has a base 10 determining a stable support plane A for the bait trap 1, inclined with respect to the straight plane B in which the attached edges 4 of both bottom and top sheets 2, 3 forming the bait trap 1 are inscribed. Furthermore, the enclosure 5 is also configured such that it has a walkway 15 and a support 16 coplanar with the support plane A of the base 10 of the enclosure 5. The drying up of the bait 6 is therefore delayed as the evaporated bait 6 is prevented from seeping out of the bait trap 1 both through the inclination of the top sheet 3 arranged like a roof of the enclosure 5 and through the narrow walkway 15 that makes it difficult for the evaporated bait 6 to exit; furthermore the walkway 15 makes it easier for the insects to access the bait 6 through the inlet 7 by means of said walkway 15.

Nevertheless, since the inclined area of the top sheet 3 closing the top portion of the enclosure 5 is inclined towards the inlet 7 of the bait trap 1, it favors the sliding of the evaporated bait 6 over said top sheet 3 towards the inlet 7 as it condenses forming droplets. To prevent this effect which makes it easier for the bait 6 to dry up, the area of the top sheet 3 closing the top portion of the enclosure 5 is provided with means for directing the droplets 13 of condensate 12 that may slide over its inner face back to the enclosure 5, in the manner schematically shown by the arrow in FIG. 5.

To make the manufacture of said means for directing the droplets 13 of condensate 12 easier, in the embodiment variant shown in FIGS. 1 to 5, shown in detail in the section of FIG. 5, the means for directing the droplets 13 of condensate 12 are formed by a transverse rib 14 arranged in the roof of the enclosure 5, formed by a notch in the top sheet 3. Logically, it is envisaged that the means for directing the droplets 13 of condensate 12 can be different and have other shapes in other embodiment variants (saw tooth, vault, etc.)

The bait trap 1 shown in FIGS. 6a to 6c illustrates a second embodiment variant suitable for larger insects, such as cockroaches, which is also provided with an enclosure 5 and a reservoir 8 the operation of which is similar to that described above. It must be pointed out that in this second embodiment variant the inlet 7 is larger and is arranged at a higher level than the support plane of the base of the enclosure 5 to prevent the bait 6 that will be placed in the base of the enclosure 5, as illustrated in FIG. 6c, from seeping out, in which figure the bait trap 1 is shown in an operative position after the removable portion 11 is torn off, opening the inlet 7, and pressing its reservoir 8 for transferring bait 6 to the enclosure 5.

FIGS. 7a to 7c show a third embodiment variant of the bait trap 1 similar to that shown above in FIGS. 6a to 6c but in which the enclosure 5 comprises two inlets 7, 7' to allow independent access of two insects of the type that cannot access it simultaneously through one and the same inlet, such as cockroaches, for example. The efficiency of the bait trap 1 is therefore improved as it favors more insects being able to consume the bait 6 simultaneously through different inlets. FIG. 7c shows this bait trap 1 in an operative position after the removable portions 11 are torn off, opening the inlets 7, 7', and pressing its reservoir 8 to transfer bait 6 to the enclosure 5.

Figure 8:
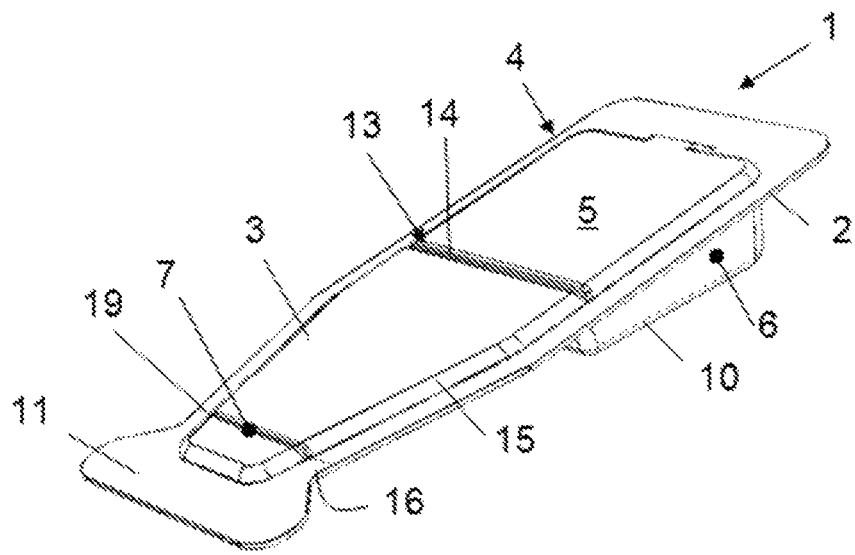
FIGS. 8 and 9 show others embodiment variants of the bait trap for insects.

FIG. 8 shows another bait trap 1 similar to that described in FIGS. 1 to 5 but without a reservoir. Nevertheless, this bait trap 1 incorporates advantages to delay the drying up of the bait 6, both through the inclination of its top sheet 3 in an operative position and through the means for directing the droplets 13 of condensate, which is also a groove 14 in the case shown herein. Logically, all the variants applicable to the variant described in FIGS. 1 to 5 would be applicable to this variant, with the exception of the reservoir.

Figure 9:
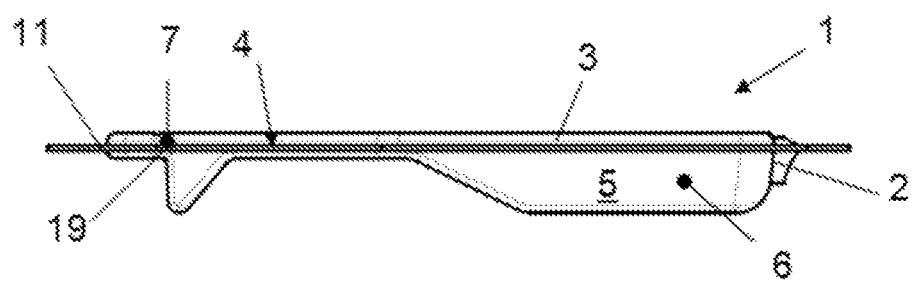

FIG. 9 shows another bait trap 1 in which the inlet 7 would be located in an elevated position after being unsealed, preventing external elements, such as rainwater, mud or dirt from being able to get into the bait trap 1, affecting the bait 6. Logically, this bait trap 1 could also incorporate a reservoir such as those described above.

FIGS. 10a to 10d show a fourth embodiment variant of the bait trap 1 similar to that shown above in FIGS. 7a to 7c in which the enclosure 5 also comprises two removable portions 11 which allow opening respective inlets in the manner described above. These inlets allow independent access of two insects of the type that cannot access it simultaneously through one and the same inlet, such as cockroaches, for example.

Figure 10D:
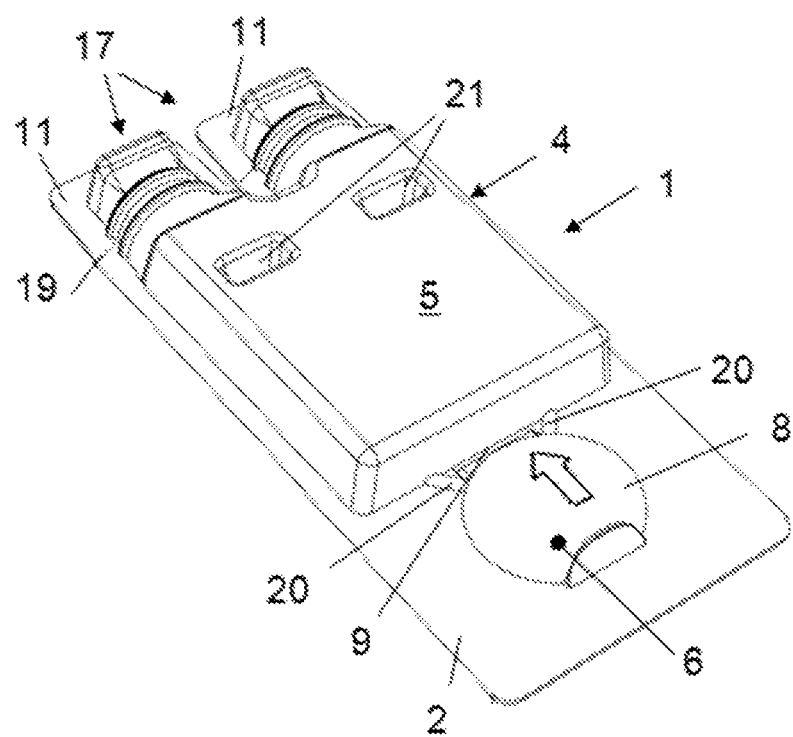

The variant of the bait trap 1 shown in FIGS. 10a to 10d also has a set of recesses 21 in the enclosure 5. This set of recesses 21 acts as an obstacle preventing, after arranging the bait trap 1 in an operative position, i.e., when at least one of the removable portions 11 has been removed exposing the inlet to the enclosure and the reservoir 8 has been pressed to transfer bait 6 to the enclosure 5, access to the bait 6, which will be stored in the rear portion of the enclosure 5, for example, by a child who inserts his/her finger through the inlet. As seen, the recesses 21 can be aligned with the inlets, acting as a stop when a straight finger is inserted therein, for example. Nevertheless, it is necessary to leave a passage between the recesses 21 so that the insect can reach the bait 6. However, to prevent a child from being able to access the bait 6 through this passage by bending his/her finger, it would be appropriate to provide other recesses 21, as shown in FIG. 10*b*, allowing the insect to pass but preventing a person from accessing the bait 6 by bending his/her finger. It must be taken into account that the type of bait 6 used in such traps is a pasty bait, so in an operative position, when the reservoir 8 is pressed and the leak-tight but reversible attachment of the passage 9 opens, the bait 6 will not flow freely throughout the entire enclosure 5 but will remain stored in the rear portion of said enclosure 5.

Since the bait 6 can be a pasty bait, for example a gel, in this case it is recommendable for the reservoir 8 and the enclosure 5 to furthermore be communicated through at least one auxiliary conduit 20, such as the two auxiliary conduits 20 shown in FIGS. 10*a* to 10*d*, for example. This auxiliary conduit 20 makes it easier to transfer the bait not only through passage 9 but also through the auxiliary conduits 20 when the user presses the reservoir 8. It must be taken into account that since the bait 6 is a pasty bait, it will not spill out through the auxiliary conduits 20 into the enclosure 5 during handling and transport.

It is seen that the variant shown in FIGS. 10*a* to 10*d* allows using same regardless of whether it is supported on its top sheet 3 or bottom sheet 2 since both faces of the enclosure 5 on which the bait trap 1 will rest have support planes, just as the variant shown above in FIGS. 7*a* to 7*c* does.

The invention claimed is:

1. A bait trap for insects comprising a bottom sheet and a top sheet attached to one another in a leak-tight manner at respective edges of the bottom sheet and the top sheet and forming an enclosure for holding bait, and at least one inlet communicating with the enclosure and sized so that a target insect can access the enclosure and reach the bait, wherein the bottom and top sheets also form a bait reservoir connected with the enclosure through an initially obstructed passage suitable for being opened and allowing transferring bait from the reservoir to the enclosure in response to a pressure increase in the reservoir as the reservoir is being pressed using one's fingers, wherein the passage is obstructed by the leak-tight but reversible attachment between respective portions of the bottom and top sheet sealing communication between the reservoir and the enclosure.

2. The bait trap according to claim 1, characterized in that the leak-tight but reversible attachment is an attachment obtained by heat welding at least inner faces of the bottom and top sheets.

3. The bait trap according to claim 1, characterized in that each inlet is sealed by a removable portion of the bottom sheet and top sheet.

4. The bait trap according to claim 3, characterized in that the removable portion comprises a pre-cut for tearing off said removable portion.

5. The bait trap according to claim 1, characterized in that the enclosure, formed in the bottom sheet, is configured with a base determining a stable support plane for the bait trap inclined with respect to a straight plane in which the attached edges of both bottom and top sheets forming the bait trap are inscribed.

6. The bait trap according to claim 5, characterized in that an area of the top sheet closing a top portion of the enclosure is inclined towards the inlet of the bait trap when the latter rests on a horizontal surface along the support plane determined by the base of the enclosure, this area of the top sheet being provided with means for directing droplets of condensate that may slide over an inner face towards the enclosure.

7. The bait trap according to claim 6, characterized in that the means for directing the droplets of condensate are formed by a transverse rib.

8. The bait trap according to claim 7, characterized in that the rib is formed by a notch in the top sheet.

9. The bait trap according to claim 5, characterized in that the enclosure is configured with a walkway and a support coplanar with the support plane of the base of the enclosure.

10. The bait trap according to claim 1, characterized in that the enclosure comprises two inlets.

11. The bait trap according to claim 1, characterized in that each inlet is arranged in a projection of the enclosure.

12. The bait trap according to claim 1, characterized in that the enclosure is oblong and each of the at least one inlet and the reservoir are arranged at opposite ends of said enclosure.

13. The bait trap according to claim 1, characterized in that the enclosure comprises at least one recess aligned with the inlet.

14. The bait trap according to claim 1, comprising at least one auxiliary conduit communicating the reservoir and the enclosure.

15. The bait trap according to claim 1, wherein in an unopened state, the bait trap contains bait in the reservoir.

16. The bait trap according to claim 15, wherein in the unopened state, the at least one inlet is closed and openable to communicate the enclosure with an exterior of the bait trap and wherein the reservoir is configured so that when pressed transfers the bait from the reservoir to the enclosure without dispensing the bait to the exterior of the bait trap through the inlet.

* * * * *